United States Patent

[11] 3,625,575

[72] Inventor Lee T. Darnell
 Rockford, Ill.
[21] Appl. No. 848,563
[22] Filed Aug. 8, 1969
[45] Patented Dec. 7, 1971
[73] Assignee Amerock Corporation
 Rockford, Ill.

[54] ANTIFRICTION ROLLER
 9 Claims, 4 Drawing Figs.
[52] U.S. Cl. .................................................. 308/3.8,
 29/148.4 D, 308/6
[51] Int. Cl. ..................................................... F16c 21/00
[50] Field of Search ........................................ 308/3.8, 8,
 16, DIG. 7, 20, 190, 181, 6; 29/148.4 A, 511

[56] References Cited
 UNITED STATES PATENTS
2,995,405 8/1961 Ferdig ........................ 308/DIG. 7
2,768,725 10/1956 Foulds et al. ................ 29/511 X
3,250,581 5/1966 Honroth ...................... 29/148.4 A X Primary Examiner—Martin P. Schwadron
Assistant Examiner—R. H. Lazarus
Attorney—Wolfe, Hubbard, Leydig, Voit & Osann ABSTRACT: An antifriction roller for use in a drawer slide. The roller is formed by a generally cylindrical inner race, a plurality of balls seated in the inner race, an outer race telescoped over the balls and the inner race, and a cup-shaped nylon tire formed with a bottom wall and a sidewall telescoped over the outer race. A radially outwardly extending shoulder is formed around the periphery of the outer race and is seated in an annular groove in the tire with a snap fit to held hold the tire on the outer race. To reduce the tendency of the tire to separate axially from the outer race, a lip is formed on the sidewall of the tire and bears against the outer race. The lip is formed from the material of the sidewall after the tire has been telescoped over the outer race. To accomplish this, a circular die is pressed against the inner portion of the end of the sidewall to deform the material of the inner portion of the sidewall and mold the deformed material in a cold operation into the lip. The lip is formed between the outer die and the outer race thus causing one surface of the lip to engage the outer surface of the outer race and to assume the shape of the outer surface of the outer race.

PATENTED DEC 7 1971 3,625,575

INVENTOR.
LEE T. DARNELL
BY
Wolfe, Hubbard, Voit & Osann
ATTORNEYS.

ANTIFRICTION ROLLER

BACKGROUND OF THE INVENTION

This invention relates to an antifriction roller which is subject to forces acting on the roller along the axis of the roller and, more particularly, to rollers used in slides for drawers. A typical roller comprises a plastic tire which is telescoped over a ball bearing hub and secured to the hub by engaging surfaces on the tire and the hub.

SUMMARY OF THE INVENTION

The primary object of the present invention is increase the service life of a roller of the above character by mounting the tire on the hub more securely than has been possible heretofore in devices of a similar nature so as to reduce the tendency of the tire to separate axially from the hub as a result of the forces imposed on the roller.

It is a more detailed object to accomplish the above by deforming a portion of the tire into engagement with the hub after the two have been telescoped together and thereby form the tire with a lip which hugs the hub and which coacts with the engaging surfaces to restrict axial separation of the tire and the hub.

Other objects and advantages of the invention will become apparent from the following detailed description when taken in connection with the accompanying drawings.

DESCRIPTION OF THE PREFERRED EMBODIMENT

Figure 1:
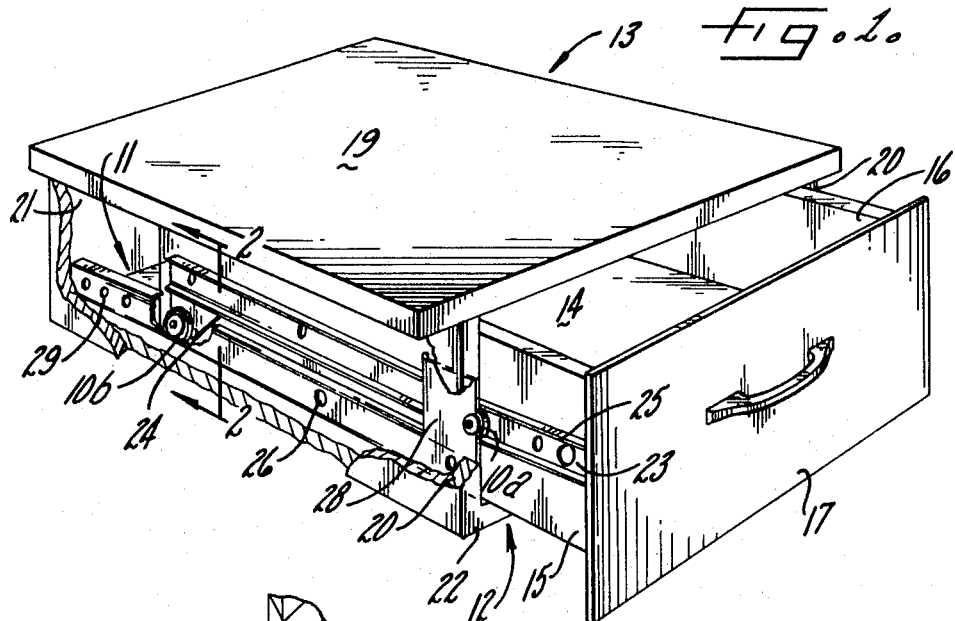
FIG. 1 is a perspective view with parts broken away of a drawer and cabinet arrangement in which the drawer is mounted by a drawer slide equipped with new and improved antifriction rollers embodying the novel features of the present invention.

As shown in the drawings for purposes of illustration, the invention is embodied in an antifriction roller 10 (FIG. 3) for use in a drawer slide unit 11 (FIG. 1) which guides a drawer 12 for movement into and out of a cabinet 13. The drawer is formed by a bottom 14, two sidewalls 15 and 16, a front wall 17 and a rear wall (not shown). As shown, the drawer slides into and out of an opening in the front face of the cabinet which is formed with a top 19, two sidewalls 20, a back wall 21 and a cross rail 22.

For ease of movement into and out of the cabinet 13, the drawer 12 is supported on each side by a slide unit 11 (only one unit being shown). As shown in FIG. 1, a channel-shaped guide member 23 with a depending leg 24 at its rear end is mounted on the sidewall 15 of the drawer with the rear end positioned slightly below the forward end and with the flanges 25 of the channel extending toward the sidewall 20 of the cabinet. A second channel-shaped guide member 26 is mounted on the sidewall 20 of the cabinet below the level of the first channel-shaped member with the flanges 27 (FIG. 2) of the channel 26 extending toward the sidewall of the drawer and with a leg 28 (FIG. 1) extending upwardly on the forward end portion.

Figure 2:
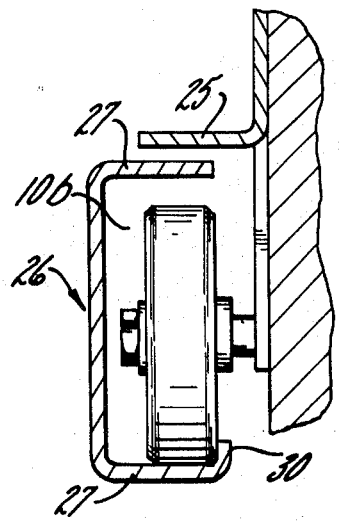
FIG. 2 is an enlarged fragmentary cross section taken substantially along the line 2—2 of FIG. 1.

To support the drawer 12 for easy movement and raise the latter above the bottom of the cabinet 13, a pair of the antifriction rollers 10a and 10b (FIG. 1) ride in the channel-shaped members. One roller 10a is journaled on the leg 28 at the forward end of the second channel-shaped member 26 and is positioned within the channel-shaped member 23 carried by the drawer. The second roller 10b is journaled on the leg 24 at the rear end of the first channel-shaped member and rolls along the lower flange 27 of the channel-shaped member 26 on the cabinet wall 20 as the drawer moves in and out. To keep the drawer centered within the opening in the cabinet and prevent the roller 10b from falling off the flange 27, the latter is bent upwardly at its inner edge to form a curb 30 (FIG. 2).

Figure 3:
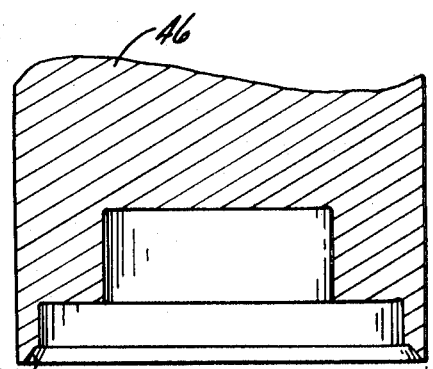
FIG. 3 is an enlarged cross section of the roller of FIG. 2 shown in a partially assembled position.
Figure 3:
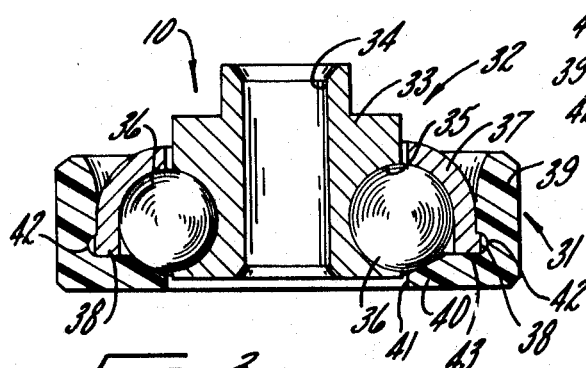

To form the antifriction rollers 10, a tire 31 (FIG. 3) made of plastic such as nylon is telescoped axially over a ball bearing hub 32. The inner race 33 of the hub is generally cylindrical with an axial bore 34, and an annular groove 35 of semicircular cross section for seating a plurality of balls 36 is formed in the outer surface of the inner race. The balls are placed in the groove, and then an outer race 37 is telescoped over the inner race and the balls. As shown in FIG. 3, the outer race is a hollow cylindrical member in which the wall curves inwardly at the upper end from an inner diameter large enough to fit over the balls and the inner race to an inner diameter slightly larger than the inner race, and an annular shoulder 38 is formed around the outer periphery of the outer race on the lower end portion. The tire is cup-shaped with a sidewall 39 and a bottom wall 40 formed with an axially extending circular hole 41 of a diameter larger than the diameter of the inner race.

To mate with the annular shoulder 38 on the outer race 37 and hold the tire 31 on the hub 32, an annular groove 42 is formed in the inside face of the sidewall 39 of the tire. The tire is telescoped over the hub until the shoulder 38 snaps into the groove 42 and the lower end 43 of the outer race engages the inner face of the bottom wall of the tire. Some resistance to axial separation of the tire from the hub caused by the movement of the drawer 12 from side-to-side as the latter is slid into and out of the cabinet 13 is created by the seating of the shoulder in the groove. Thus, the entire assembly is held together as a result of the shoulder seating in the groove during assembly.

Figure 4:
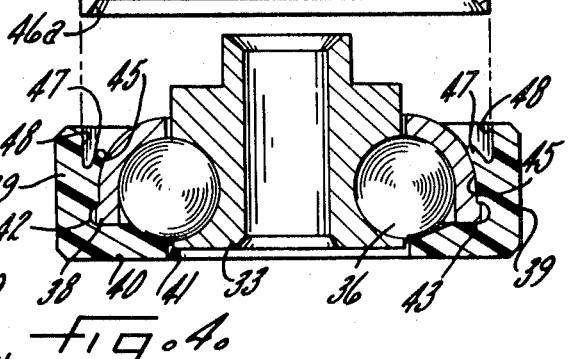
FIG. 4 is a view similar to FIG. 3 but showing a portion of the tire deformed into engagement with the hub and showing a fragmentary sectional view of a die usable to deform the tire.

In accordance with the present invention, the tire 31 is mounted on the hub 32 more securely than has been possible heretofore with similar devices and, for this purpose, a portion of the sidewall 39 of the tire is deformed into engagement with the outer surface 45 (FIG. 4) of the outer race 37 after the tire has been telescoped over the outer race. With this arrangement, the tire is joined to the hub more positively, and the tendency of the tire to separate axially from the hub is reduced.

In this instance, a circular die 46 with a cavity 46a (FIG. 4) with an outside diameter smaller than the outside diameter of the tire 31 is pressed down upon the end of the inside portion of the sidewall 39 of the tire 31, after the tire has been telescoped over the hub 32, to deform, in a cold press operation, the inner portion of the plastic material of the sidewall and to form this material into an inwardly extending annular lip 47 (FIG. 4) which engages the curved portion of the outer wall of the outer race. As the material is deformed, it is pulled away from the sidewall thus forming a groove 48 (FIG. 4) between the lip and the sidewall and, because the material is deformed in this manner, the outer surface of the sidewall remains unchanged. With this arrangement, the lip is formed by pressing the material between the die and the curved portion of the outer race thus causing the outer curved surface 45 of the race to act as a mandrel. In this way, the lip is formed to the curvature of the outer surface of the outer race and is deformed into mating or hugging engagement with the outer race. Because the lip curves around the outer surface of the outer race, the lip tends to resist axial movement of the tire 31 that could cause the tire to slide off the hub 32 in the opposite direction that the tire was telescoped onto the hub.

It will be observed that the deformation of a portion of the sidewall 39 of the tire 31, after the tire has been telescoped over the hub 32, to form an inwardly extending lip 47 which engages the outer race 37 is a particularly advantageous arrangement. With this arrangement, the tire is held on the hub more securely to reduce the tendency of the tire to separate axially from the hub and augments the holding force provided by the shoulder 38 and the groove 42. Additionally, by deforming the material of the sidewall after the tire is telescoped over the hub, the outer surface 45 of the outer race may be used to mold the shape of the lip and thus insure hugging engagement of the lip on the outer race.

I claim as my invention:

1. An antifriction roller comprising a bearing having a generally cylindrical inner race, a plurality of balls seated in said race, an outer race telescoped over said inner race and said balls and formed with a radially outwardly extending flange around its outer periphery, a cup-shaped tire of plastic material having a sidewall and a bottom wall with the sidewall of the tire telescoped over said outer race, and a groove formed in said tire with said flange being seated in said groove with a snap fit to hold said tire on said outer race, the improvement in said roller comprising, an annular lip formed around the inner side of said sidewall and extending inwardly therefrom into bearing engagement with said outer race at a location spaced axially from said flange, said lip being formed on said tire after said tire is telescoped on said outer race and coacting with said flange and said groove to restrict axial separation of the tire from the outer race.

2. The antifriction roller of claim 1 in which a portion of the outer surface of said outer race is curved and in which said lip is deformed against said curved portion and presents a mating curved surface which engages said curved portion.

3. An antifriction roller comprising, in combination, a bearing having a generally cylindrical inner race, a plurality of balls seated in said race, an outer race telescoped over said inner race and said balls, a tire telescoped over said outer race, engageable surfaces on said tire and said outer race for restricting axial separation of said tire from the outer race, and a lip formed on said tire and extending inwardly therefrom in hugging engagement with said outer race at a location spaced axially from said engageable surfaces thereby to further restrict axial separation of said tire from said outer race.

4. The antifriction roller of claim 3 in which said surfaces include a groove formed in and extending around the inner side of said tire, a radially outwardly extending flange formed around the periphery of said outer race and seated in said flange, said lip being an annular lip integral with and extending around said tire and spaced axially from said groove.

5. The antifriction roller of claim 4 in which said tire is cup-shaped and has a bottom wall and a sidewall, said lip being formed on said sidewall and disposed on the inner side of the opposite side of said groove from said bottom wall.

6. The antifriction roller of claim 5 in which a portion of the outer surface of said outer race is curved to converge toward said inner race as the outer race extends axially away from said bottom wall, said lip being deformed from said sidewall after said tire is telescoped onto said outer race with said lip being formed into a curved surface which curves around and engages said curved portion of said outer race.

7. The method of forming an antifriction roller comprising the steps of:
 a. telescoping an outer bearing race over a generally cylindrical inner bearing race and a plurality of balls seated in the inner race,
 b. telescoping the sidewall of a cup-shaped plastic tire over the outer race until an annular flange formed on the outer race snaps into an annular groove formed in the tire, and
 c. exerting pressure on the inner portion of the sidewall to deform the inner portion of the sidewall inwardly and form an annular lip which extends inwardly and against the outer race thereby to restrict axial separation of the tire from the outer race.

8. The method of claim 7 in which the pressure is exerted on the tire by a die and in which the inner portion of the sidewall is pressed between the die and a portion of the outer surface of the outer race causing the lip to conform to the shape of the portion of the outer surface of the outer race and to be in mating engagement with the portion of the outer surface of the outer race.

9. The method of claim 7 in which a groove is formed between said lip and said sidewall during deformation of the material of the sidewall.

* * * * *